United States Patent

[11] 3,632,203

| | | | |
|---|---|---|---|
| [72] | Inventor | James A. Kolibas | |
| | | Broadview Heights, Ohio | |
| [21] | Appl. No. | 873,020 | |
| [22] | Filed | Oct. 31, 1969 | |
| [45] | Patented | Jan. 4, 1972 | |
| [73] | Assignee | Addressograph-Multigraph Corporation | |
| | | Cleveland, Ohio | |

[54] OPTICAL SCANNER
6 Claims, 5 Drawing Figs.

[52] U.S. Cl. .................................................... 355/8, 355/51
[51] Int. Cl. ......................................................... G03g 15/04
[50] Field of Search .......................................... 355/8, 50, 51, 65, 66

[56] References Cited
UNITED STATES PATENTS

| | | | |
|---|---|---|---|
| 3,062,094 | 11/1962 | Mayo .......................... | 355/47 X |
| 3,062,095 | 11/1962 | Rutkus et al.................. | 355/8 |

FOREIGN PATENTS

| | | | |
|---|---|---|---|
| 1,156,948 | 7/1969 | Great Britain............... | 355/8 |

Primary Examiner—Samuel S. Matthews
Assistant Examiner—Kenneth C. Hutchinson
Attorneys—Russell L. Root and Ray S. Pyle

ABSTRACT: A scanning device for a copying machine in which the original to be copied is stationary, the photosensitive paper moves on a conveyor, and a lens carriage moves at half the speed of the conveyor in the direction of its motion. The carriage rolls on wheels which rest on the conveyor and contact a fixed track from below, moving at half the speed of the conveyor because of the frictional contact of the wheels with the two parallel surfaces.

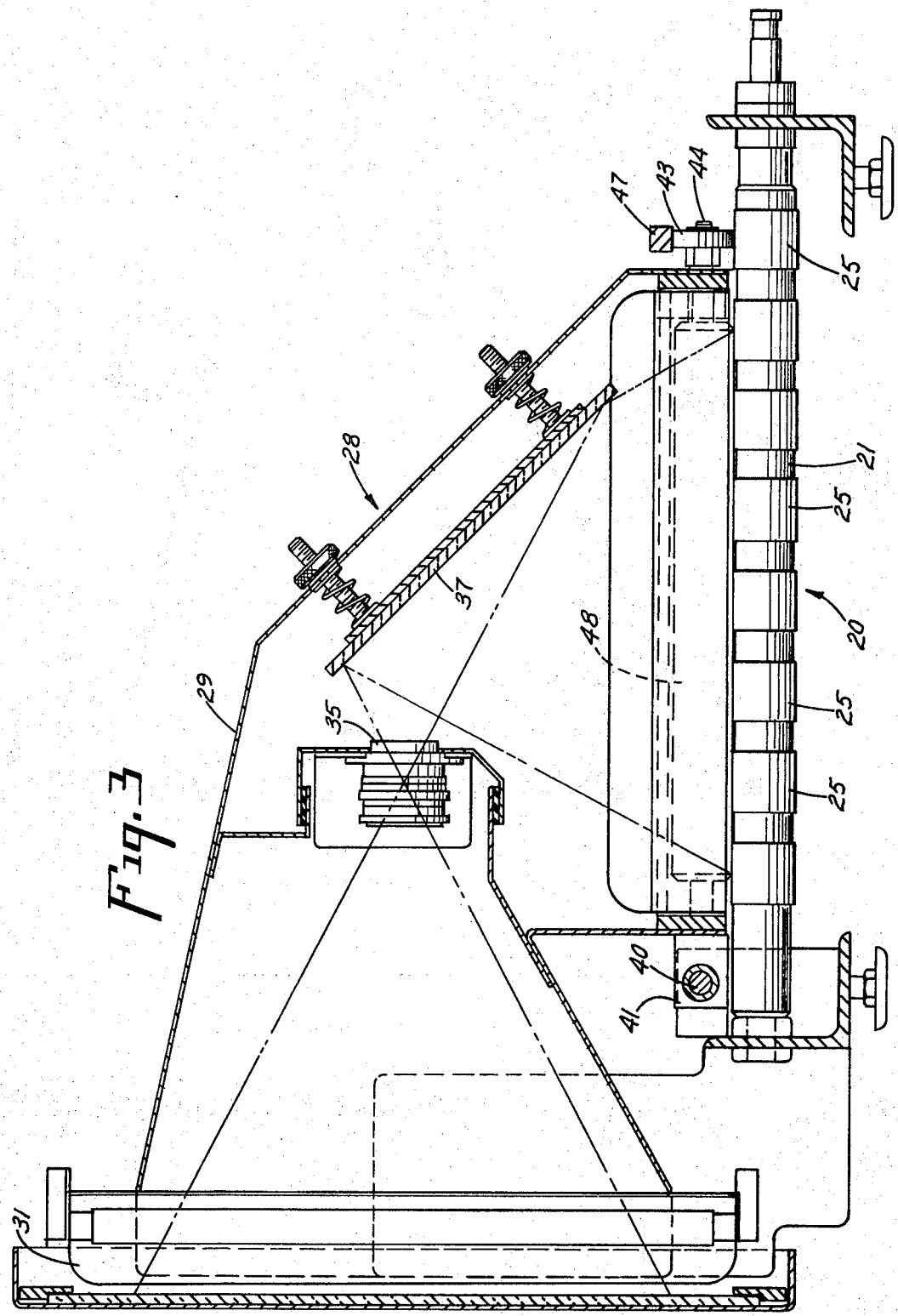

OPTICAL SCANNER

BACKGROUND OF THE INVENTION

The practical utility of this invention is in the discipline of exposing electrostatically charged sheets for copying machines and master-making machines, but the similarity of the optical system to cameras makes a brief description of the camera discipline apropos for this disclosure.

Any lens device, such as a conventional camera, if making a full frame exposure of an entire object to project that object full size onto a photosensitive sheet, will require a relatively long focal length lens and a large enclosure chamber. A wide angle lens reduces the space requirement, but not enough for modern demands in the copier art. If the image is to be the exact size of the original object, then it follows that the bulk of the container to provide a dark enclosure for the image plane will be large.

In order to reduce the bulk size of such camera devices, the slit scanner type of exposure is often used. Such a scanner is able to employ a much shorter focal length lens to view across the short dimension of a page and project that limited portion onto the image plane. A much smaller enclosure is required, but this arrangement depends upon the relative movement of two of the three components involved. Both the object and image plane must move, or one of those and the lens. Relative movement then entails exact synchronization. Any lack of synchronization, will produce blurred and unacceptable image projection.

The art is therefore faced with the necessary choice of bulk for area projection, or synchronization devices for slit scanning.

SUMMARY OF THE INVENTION

This invention requires exact synchronization also, but the object of this invention is to produce the movement of a lens at a first speed, and movement of the copy at twice that speed, by resting a lens carriage wheel on a driven copy transport conveyor, and placing a stationary surface against the wheel on the side thereof opposite the moving surface, to obtain precise one-half speed wheel hub movement relative to the transport.

This invention is in the slit-scanning discipline, and advantage of the invention is that regardless of what speed the sheet transport moves, the synchronized lens scan carriage will move exactly one-half that speed.

It is an important advantage of this invention that the drive is very precise and unvarying, with respect to the relative speed, but is substantially negligible in cost as compared to contemporary systems.

A further advantage of the invention is that the lens scan carriage may be driven at one-half the speed of a sheet transport by any size wheel or gear without altering the desired relative speed.

A still further object and advantage of the invention is that the drive will not vary with age and degree of wheel wear. Regardless of the age and condition of the driving wheel or gear, the precise two-to-one speed relationship will be maintained.

An exceptionally desired advantage of this invention, and an object sought, is that the original material is held as a stationary object. There is no possibility of damage to precious documents.

DESCRIPTION OF THE FIGURES

FIG. 3 is an end view of a sheet transport conveyor, and an elevation which is partially in section, of a scan carriage with a lens, as associated in the preferred embodiment of this invention, illustrated apart from conventional necessary associated housing and supporting equipment;

DESCRIPTION OF THE INVENTION

For convenience of description, the material to be copied will be referred to by the generally accepted term of art "original material," or more commonly as just "original." The photographically sensitive sheet is referred to as "copy sheet," but may also be referred to as a "master," because the purpose for which the equipment was developed was to produce lithograph masters from original source materials.

Figure 1:
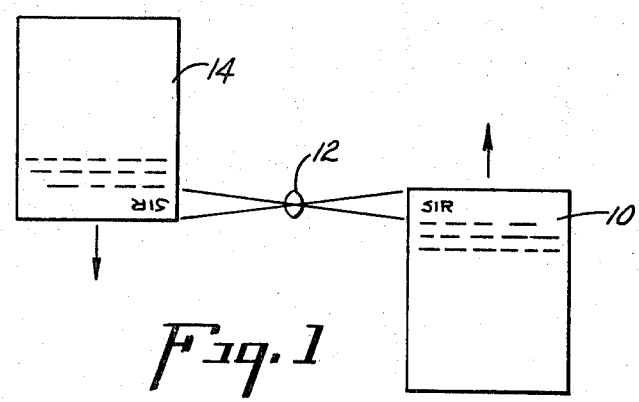
FIG. 1 is a schematic illustration of one type of relative scanning movement.

The original sheet 10 illustrated in FIG. 1 is projected through a lens 12 onto an electrostatic master sheet 14. In FIG. 1, the movement of sheets 10 and 14 are indicated to be in the opposite directions and length of the arrows are identical to suggest equal speed. This is a prior art arrangement.

In order to make the copy rational and readable, the two sheets must progress in opposite directions at equal speed. The FIG. 1 representation is conventional in many slit-scanning copier machines and requires expensive synchronization devices to assure synchronized movement of the two sheets with respect to one another throughout their entire length. Unfortunately, it is also true that such devices frequently fail to accomplish the objective sought.

Figure 2:
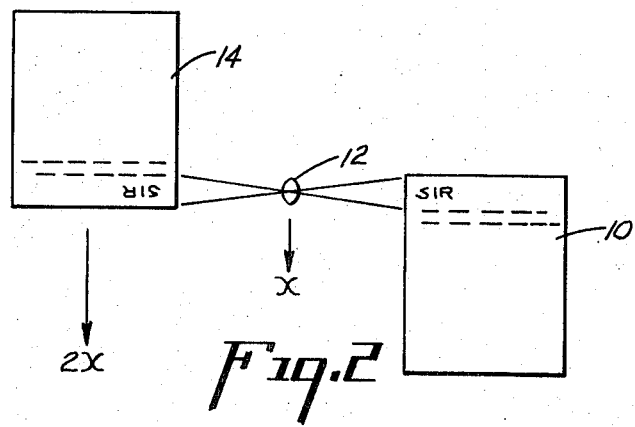
FIG. 2 is a schematic illustration of the scanning movement employed in this invention.
Figure 5:
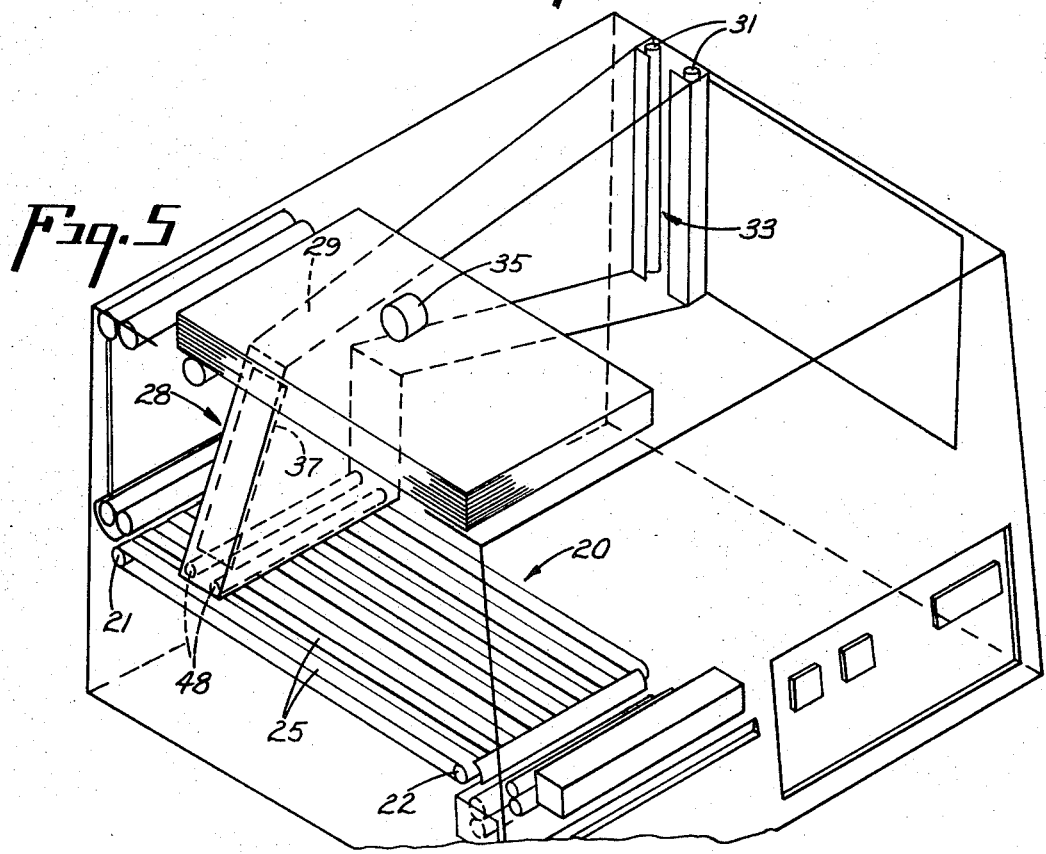
FIG. 5 is a schematic illustration of the associated components as arranged in a commercial application of the invention.

In the FIG. 2, the concept of this invention is illustrated. In this invention the lens and the copy sheet are moved in the same direction. The reverse could be true in that the sheet 14 could be the original and the copy could remain stationary as sheet 10. However, for consistency, the sheet 14 will be considered to be the copy sheet and to be the sheet which moves. The arrow, because it is twice as long as the arrow associated with the lens 12, indicates that sheet 14 moves at twice the speed of the lens.

Double speed is necessary for the copy sheet 14 because the first line of scan will reproduce line 1 of the sheet 10 on line 1 of sheet 14. Then, as the lens 12 advances one line, if the copy sheet advanced only one line, the result would be that the entire series of lines of the original sheet 10 would be all projected upon a single line 1 of the copy sheet. When the lens advances to view the line 2 of sheet 10, the copy sheet must advance one space to keep even with the lens, and another space in order to bring the second line of the copy sheet into image receiving registration with the image projected by the lens.

It has been found that the movement produces a perfect image so long as the advance movement of the sheet 14 is precisely twice that of the lens. In view of the fact that there is an instantaneous view of an infinitesimally small portion of the sheet, the continuous movement produces perfect projection of the image.

The balance of the drawings illustrate the preferred embodiment of the equipment which has been devices to carry out the principles illustrated in FIG. 2.

In order to eliminate unnecessary detail or ordinary cabinet making and mechanical and electrical apparatus, the drawings illustrate the essential portions of the invention in schematic form. In keeping with the illustration in FIG. 2, the first requirement is a means to transport the master or copy sheet 14 at some chosen speed and move the lens at an exactly synchronized speed one-half that of the transport.

Figure 4:
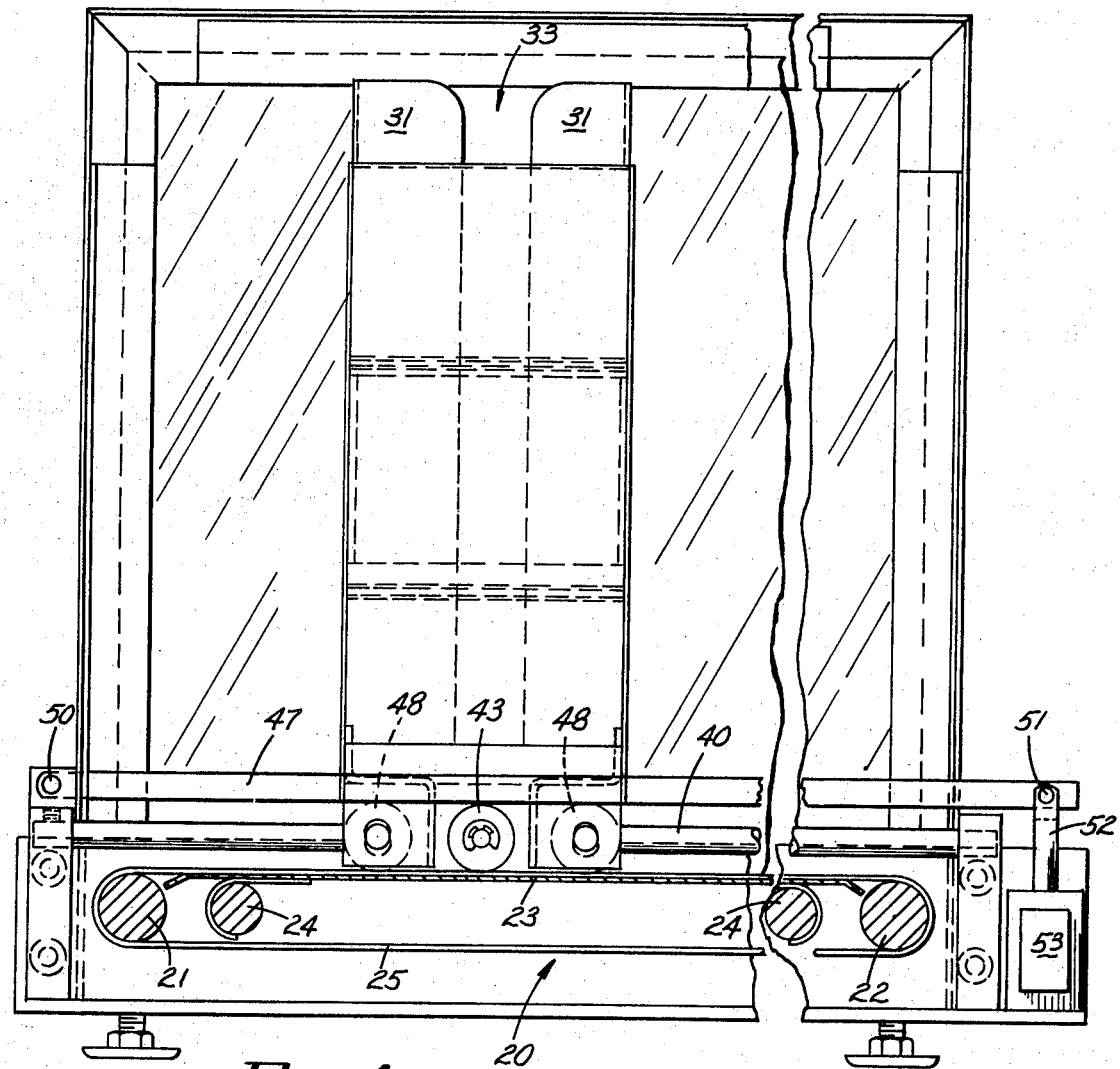
FIG. 4 is a side elevation of the sheet transport conveyor and scan carriage shown in FIG. 3.

In FIG. 4, a sheet transport conveyor 20 is composed of two rollers 21 and 22, driven by any desired transmission means from an electrical motor prime mover. These drive devices are not illustrated, being well known and understood by those skilled in the art.

A support plate 23, extends between the rollers. Crossbars 24 are provided to support plate 23, and reference to FIG. 4 will show the clips employed to mount the plate 23 upon the bars 24.

A plurality of belts 25, as seen best in FIG. 3, are preferable to one single belt. All that is required is enough friction surface moving across the top of the support plate 23 to assure smooth drive of any master or copy sheet placed upon the conveyor 20.

A scan carriage 28 is composed essentially of housing 29 roughly in the form of an L-shaped tube, and is essentially a carriage to carry the cooperating elements.

One of the cooperating elements consists of two lamp shields 31 and their lamps and supporting apparatus at the object end of the housing. The lamps are positioned with a slit space 33 between them in order to allow the lens to scan between the shield. Uniform intense lighting is therefore placed directly on the object to be scanned.

A lens 35 is supported in the housing. The manner of mounting the lens will be determined by the artisan and the illustrated method is a simple friction mounting which has proved to be satisfactory.

In order to place the image in the proper location and in proper reverse image position, a mirror 37 is mounted in the housing to receive the image projected by the lens 35 and project that image onto the surface represented by the plane which passes over the top of the plurality of belts 25. That is, it projects the image onto the position where the copy sheet 14 is to travel. Some adjustment of the mirror is necessary in order to properly position the image, and the spring and adjustment nut mounting illustrated in FIG. 3 is satisfactory.

The carriage 28 is given reciprocable mobility by means of a slide rod 40 upon which a bearing 41 is slidably mounted. The bearing 41 is mounted to the housing and therefore carries the housing weight upon the rod 40.

The rod and bearing are placed to the left of the center gravity, when viewed in FIG. 3, and a drive wheel 43 is carried on a shaft 44 at the opposite side f the conveyor 20 from the rod 40. The weight of the carriage is shared by the rod 40 and the wheel 43. The wheel 43 is positioned to ride upon one of the belts 25 at the outer extremity of the conveyor 20.

This invention operates on a well-known mechanical and mathematical principle, and produces an unusually simple and reliable scanning apparatus when applied to the movement of the scan carriage with respect to the movement of the copy sheet 14 on the transport. The drive is accomplished by the provision of a rod 47 which serves as a second track to press against the surface of the wheel 43. By providing a stationary track, in the form of the rod 47, applied to the wheel 43 on the side thereof opposite the moving belt 25, the wheel 43 will be propelled along the track rod 47 and will move its own center 44 in the direction of the belt movement at precisely one-half the speed of the belt. As those familiar with this phenomenon will understand, the diameter of the wheel 43, and the wheel condition with respect to its new condition, are immaterial. That is, as long as the wheel 43 remains circular in cross section, without badly eccentric worn spots, then it does not matter that the wheel has worn down from its original condition. Furthermore, it is acceptable to use a tooth rack type belt in place of the smooth surface belt 25 and to employ a gearwheel instead of the smooth wheel 43. These are variants which will be appreciated after this disclosure.

The image area is flanked by two floating weight rollers 48 which ride the surface of the conveyor 20 free of any burden of the scan carriage 28. In this manner the rollers hold the copy sheet firm against the surface of the several belts 25 regardless of the tendency of the copy sheet to curl.

The carriage is caused to advanced or remain at rest according to whether or not the rod 47 is pressed against the surface of the wheel 43. The rod 47 is only one manner of controlling the wheel, although it is the preferred manner. A moving track is also a possibility. With a stationary rod track 47 pressed against the top surface of the wheel 43, the moving belt 25 will propel the wheel 43 much in the manner that rolling a freewheeling tire on a roadway would advance its hub. The drive device in the illustration is simply reversed from the tire analogy.

To press the rod track 47 against the wheel 43, the rod is connected to a pivotal mounting, seen best in FIG. 4, referred to by the reference character 50. The opposite end of the rod is connected by a pivotal connection 51 to an armature 52 of a solenoid 53. Through suitable electrical connections, understood by those skilled in the art, whenever exposure is called for, solenoid 53 will pull the rod 47 into contact with the wheel 43 and cause the carriage to begin advancing at the rate of one-half of the difference of the speed between the rod track 47 and the belt 25. In the illustrated embodiment, the carriage will move at one-half the speed of the belt 25, because the speed of rod track 47 is zero. If a type of restraint other than the stationary rod 47 were employed, that restraint could move in the same direction as the belt 25 or in the opposite direction. In any event, the wheel is going to move at one-half the differential speed and in the direction of the fastest moving of the two members.

The use of a differential speed other than one-half the speed of the transport conveyor belt 25 is in the event of magnification or reduction from the original. A stationary restraint producing one-half speed of the conveyor is used when there is a one to one reproduction, and alternate speeds are used to magnify or reduce.

What is claimed is:

1. An exposure-scanning device for producing electrostatic images of originals, comprising:

a sheet conveyor means for establishing a focus plane and for conveying a copy sheet in said plane;

a copyboard holder means for establishing a fixed plane and for holding an original with the surface thereof to be copied in said plane;

a scan carriage carrying a focusing lens, illuminating means for providing radiant energy to be reflected from the original for projection through said lens upon the copy sheet, a housing enclosing said lens and illuminating means, said copyboard holder means and sheet conveyor means being oriented with respect to said lens such that an image of the material held by said copyboard is focused upon said moving plane, whereby as the carriage moves along said copyboard a line-by-line image of the original is projected upon the copy sheet;

a wheel carried by said housing by a mounting means which permits the wheel to rotate in a fixed position relative to said carriage, said sheet conveyor providing a first track on which said wheel rides; and a retainer track having a surface parallel to said sheet conveyor means and engageable with said wheel, said retainer track having a first position out of contact with the wheel and a second position in engagement therewith, and means to move the track to said second position to effect a driving of said scan carriage at a speed which is half the speed of the conveyor means and to said first position for scan carriage rest.

2. An exposure-scanning device comprising:

transport means establishing a focus plane and conveying a first sheet in a path in said plane, said transport means including a first wheel track;

holder means for establishing a fixed position for a second sheet in a focus plane;

a scan carriage carrying means including a lens for focusing one said focus plane onto the other;

a wheel rotatably carried by said carriage, and riding said first wheel track;

a second wheel track fixed with respect to the holder means and spaced from said first wheel track and adapted to ride said wheel whereby in operation with a speed differential between said first and second tracks the carriage is moved at a speed of one-half said differential in the direction of the track having the greater speed.

3. An exposure-scanning device comprising:

a sheet transport conveyor for conveying a copy sheet in a focus plane;

a first wheel track running in coordination with and at the speed of said conveyor;

holder means for holding an original in a plane;

a scan carriage carrying means including a lens for focusing the original onto the conveyor focus plane;

a wheel carried by said carriage and riding said first wheel track;

a second wheel track spaced from said first wheel track and disposed in engagement with said wheel;

and means for effecting relative movement between said first and second wheel tracks whereby in operation with a speed differential between said first and second tracks the carriage is moved at a speed of one-half said differential relative to and in the direction of the track having the greater speed.

4. An exposure-scanning device as defined in claim 3, further characterized in that:

said sheet transport conveyor comprised a plurality of separate belts reeved about oppositely disposed end rollers, and said wheel means rides directly upon one of the belts and carries at least part of the scan carriage weight to assure full engagement of the wheel means with the belt.

5. An exposure-scanning device as defined in claim 3, further characterized in that:

said track is a straight bar carried in a fixed position with respect to said conveyor, but shiftable between a first position out of contact with said wheel means and a second position parallel said conveyor and in contact with the side of said wheel opposite said conveyor.

6. An exposure-scanning device as defined in claim 3, further characterized in that:

said object plane and conveyor are positioned in planes extending in angular relationship, and a mirror is provided with said lens to reverse the image and place it on said conveyor.

* * * * *